Oct. 13, 1953  S. C. FONS ET AL  2,655,097
APPARATUS FOR DRAWING A WIRE TIE THROUGH AND AROUND
ANNULAR ARTICLES AND TWISTING THE ENDS TOGETHER
Filed Aug. 10, 1950  15 Sheets-Sheet 13
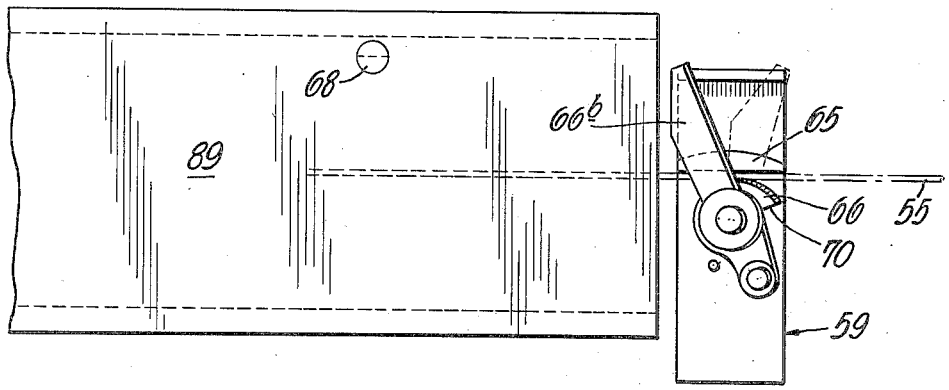
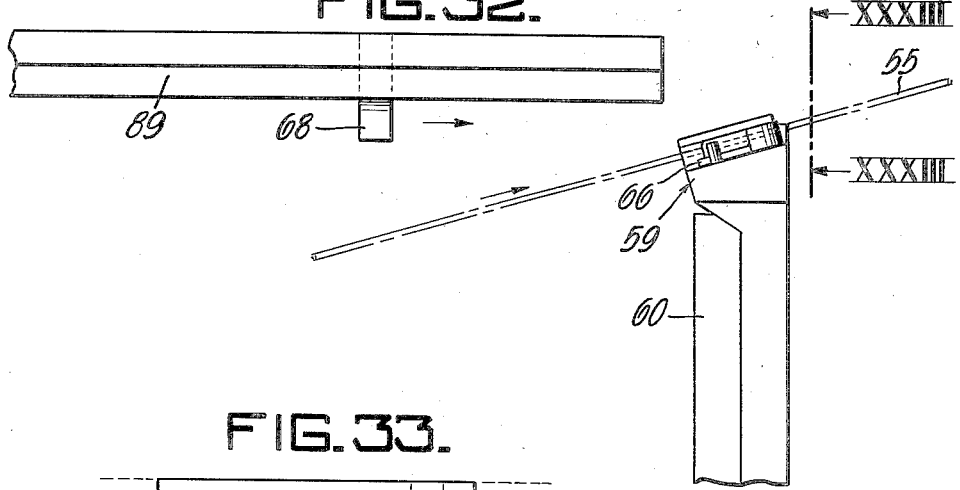
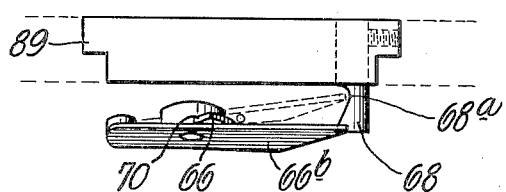

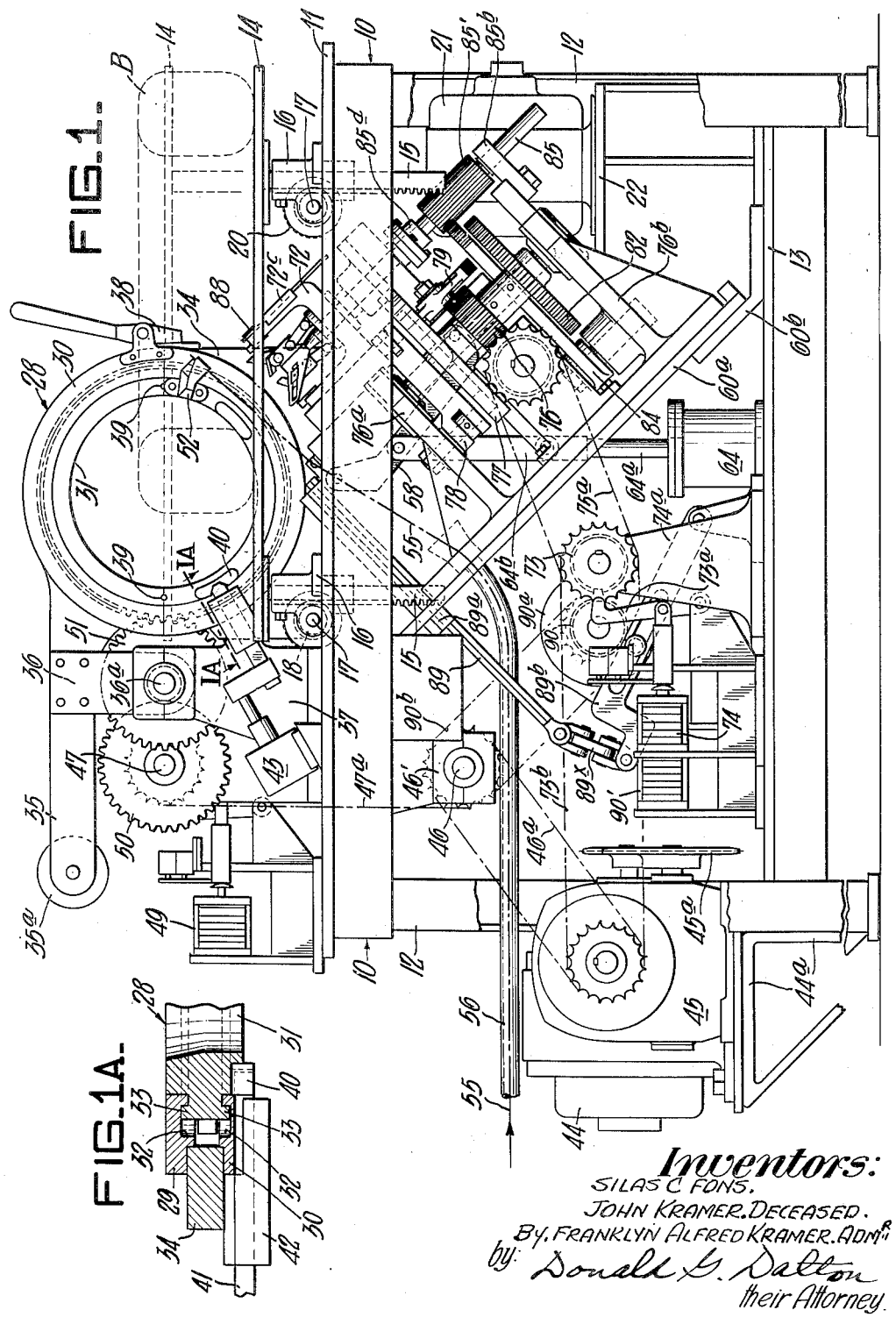

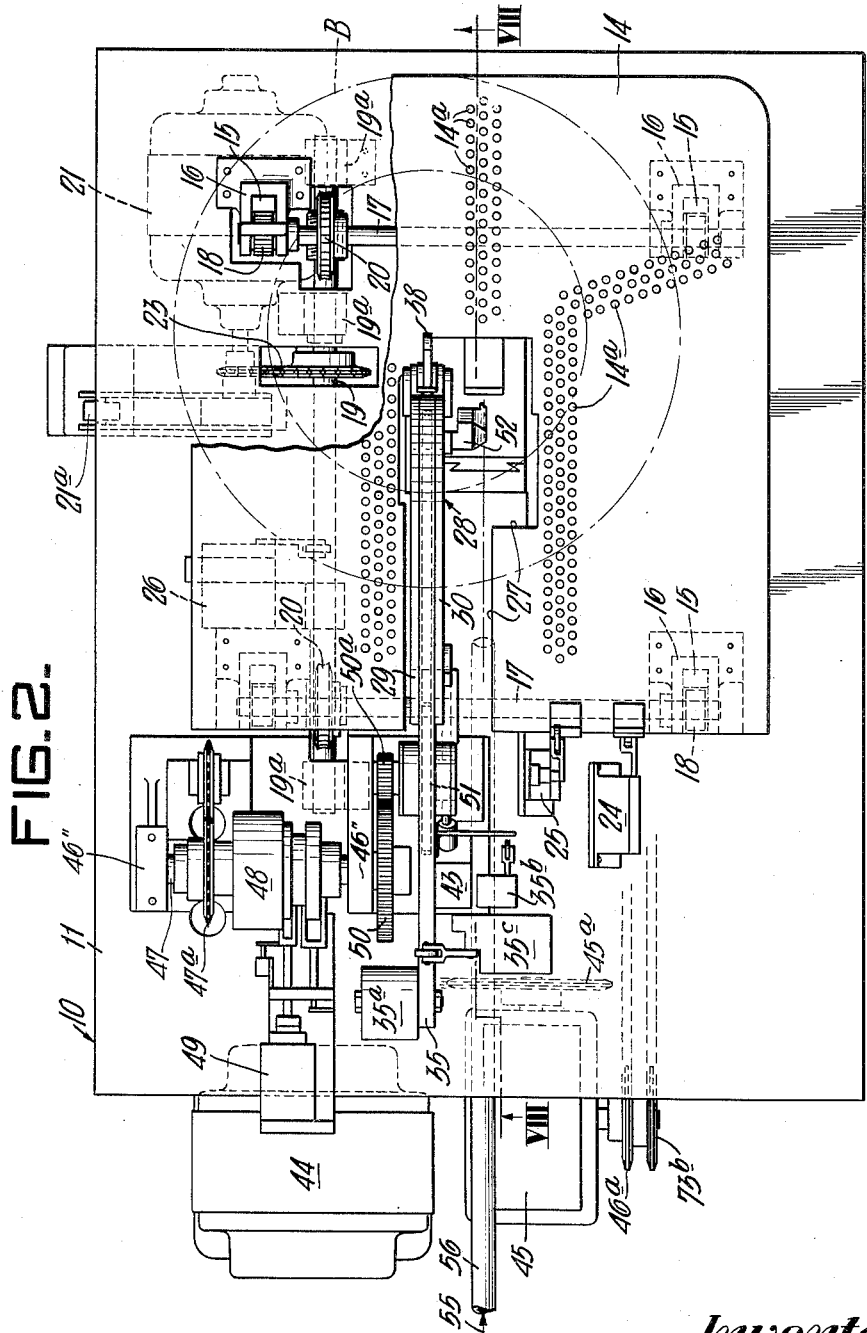

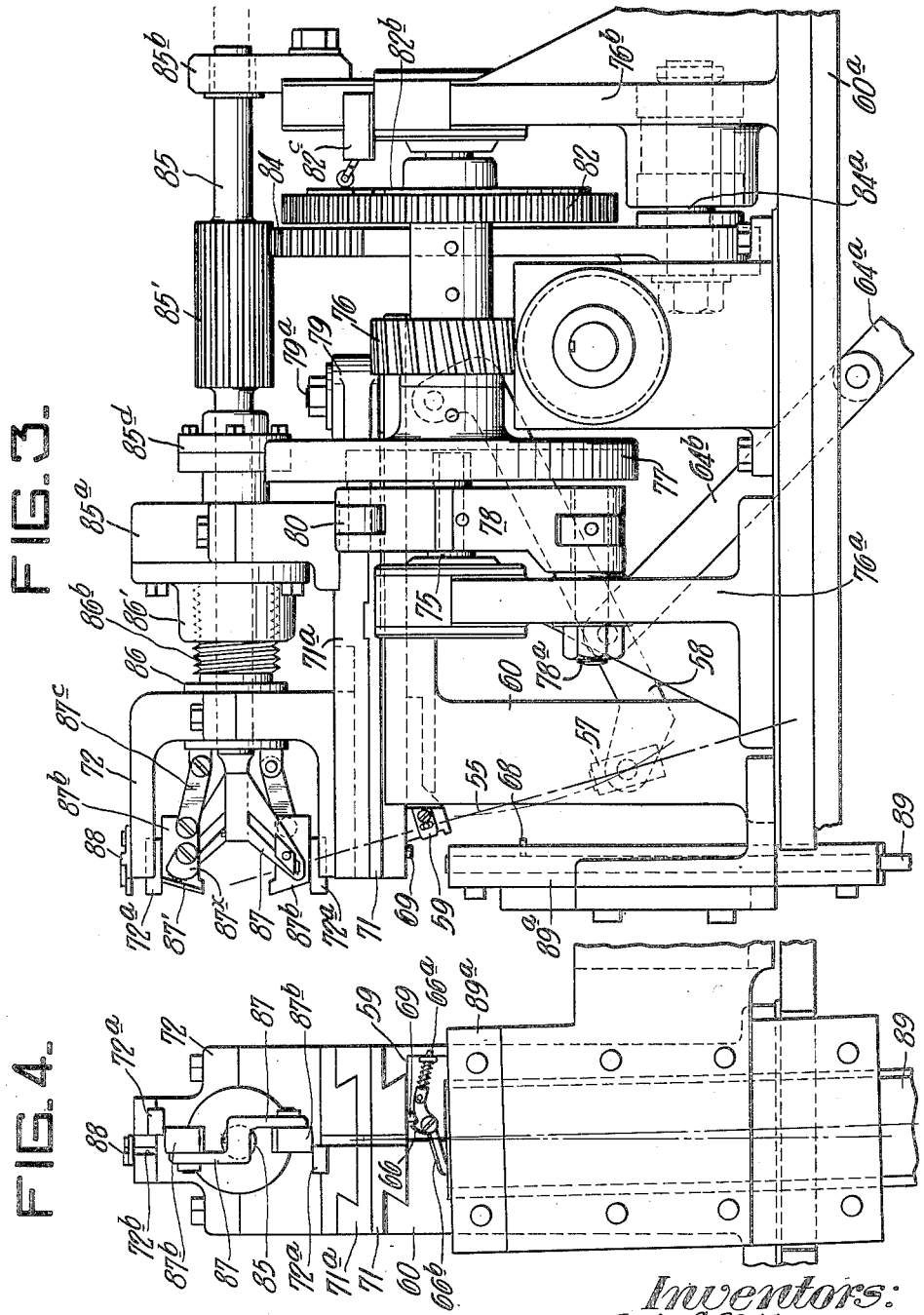

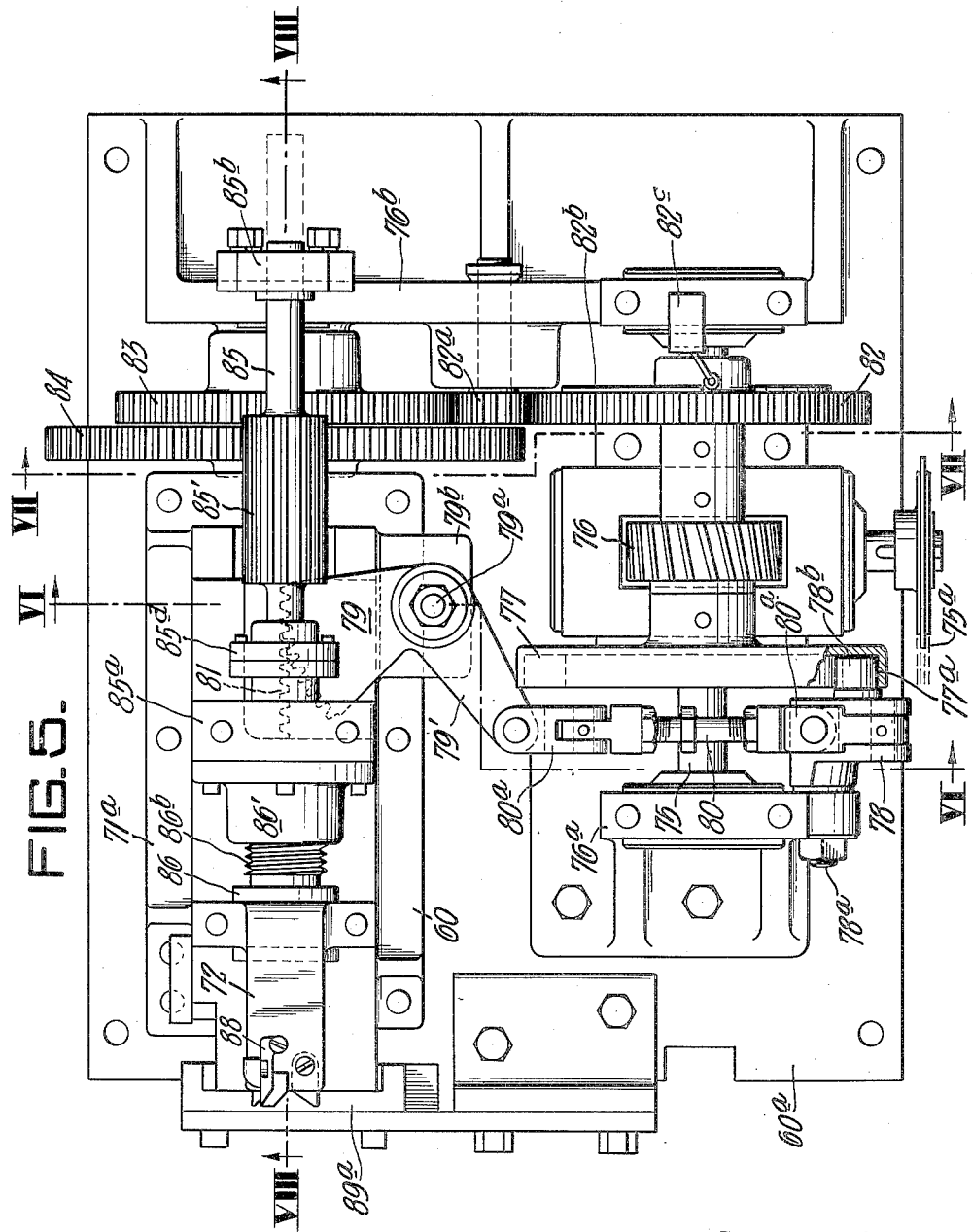

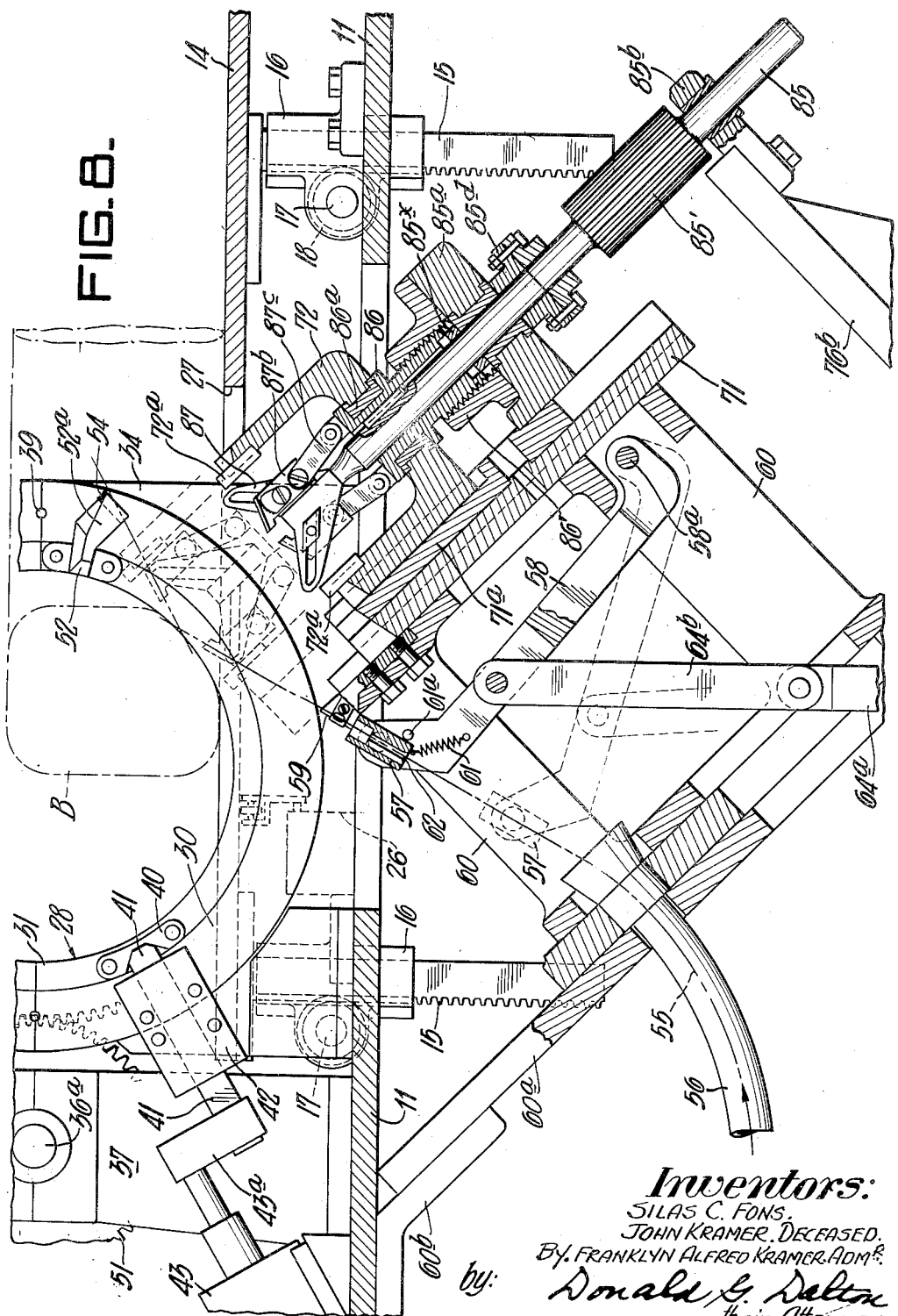

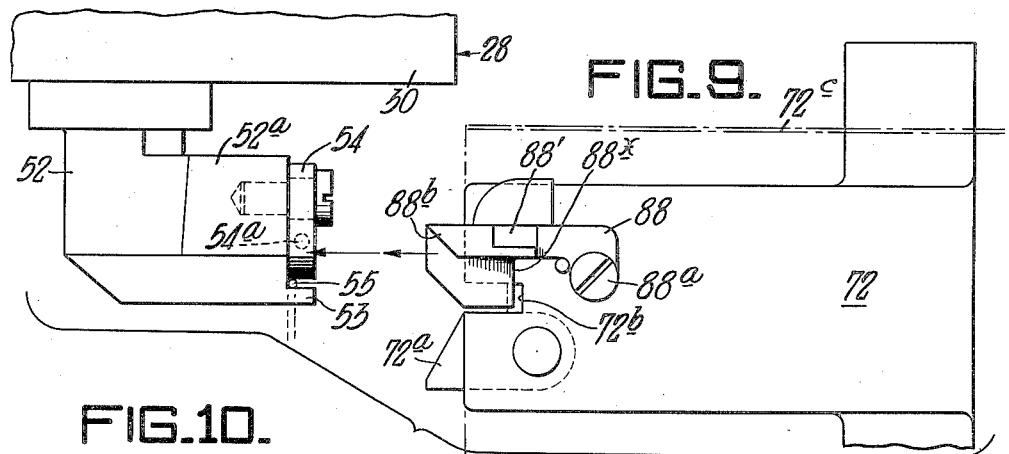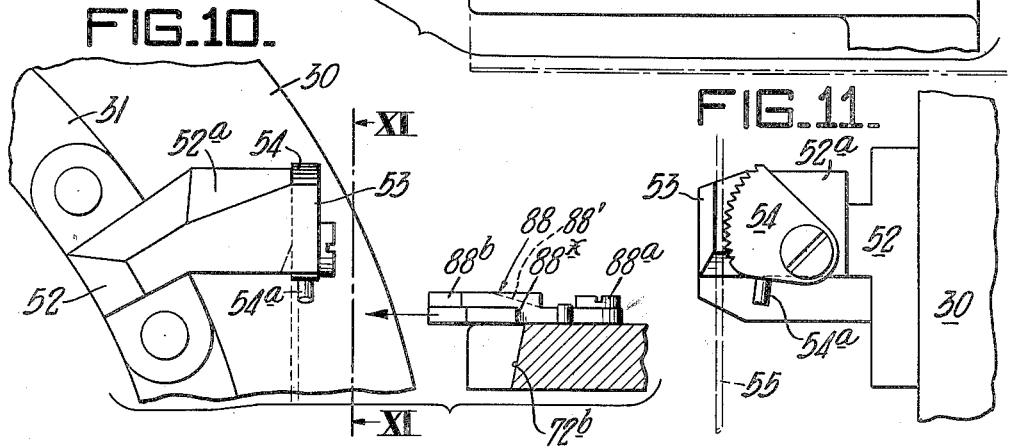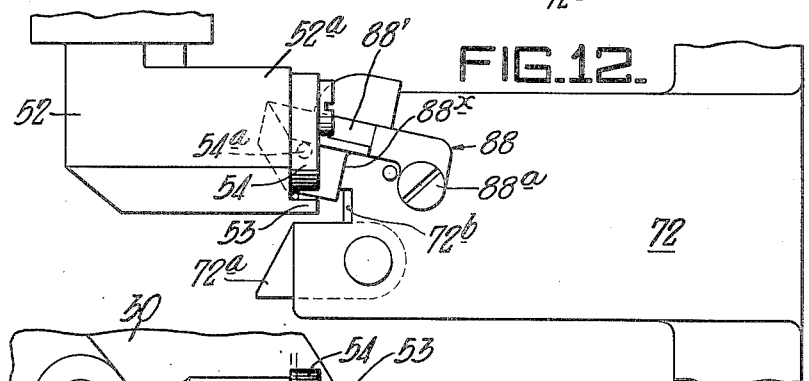

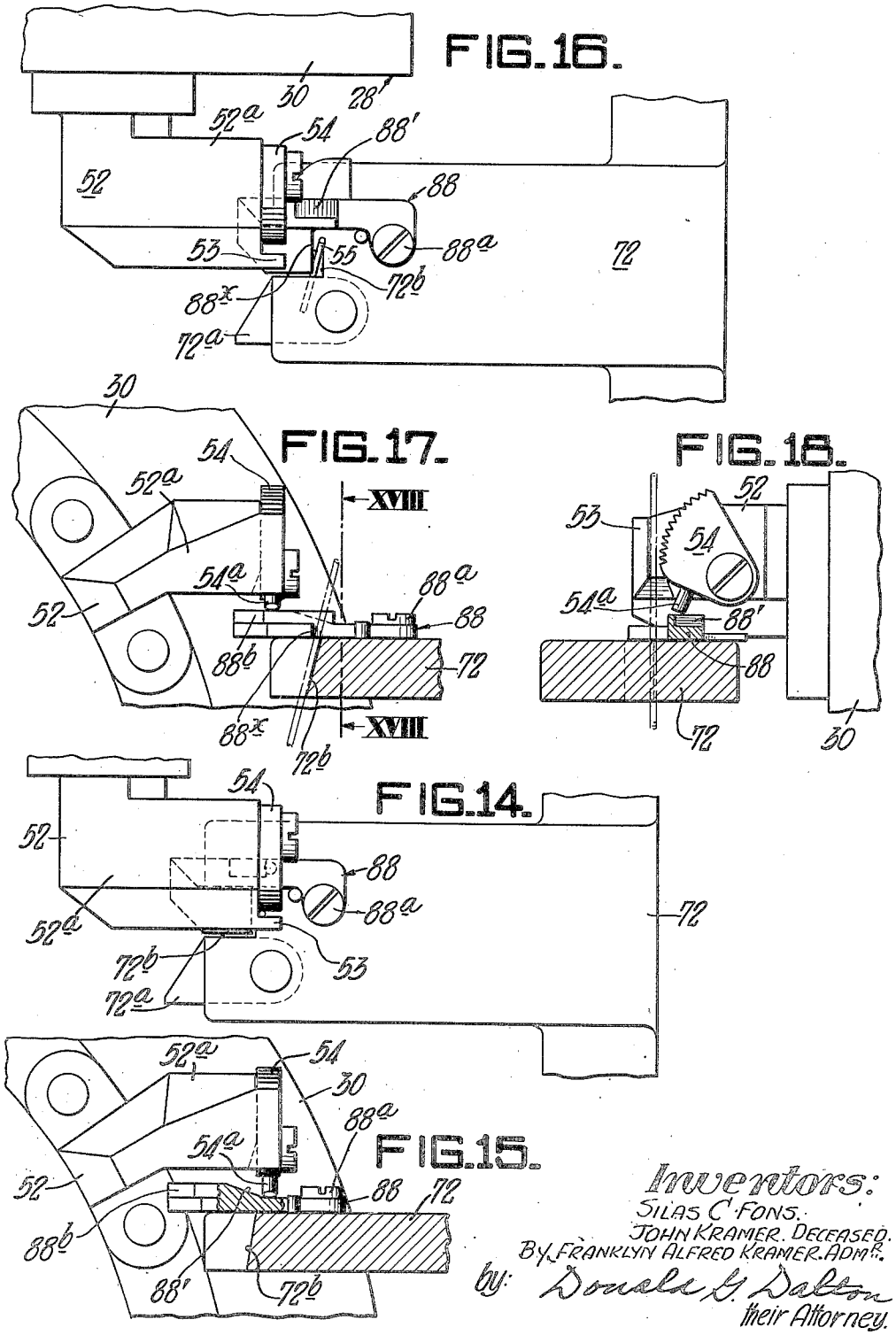

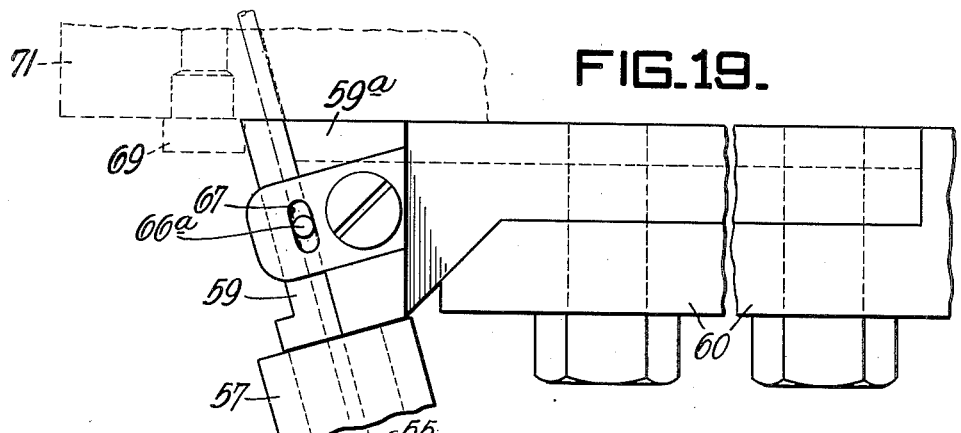
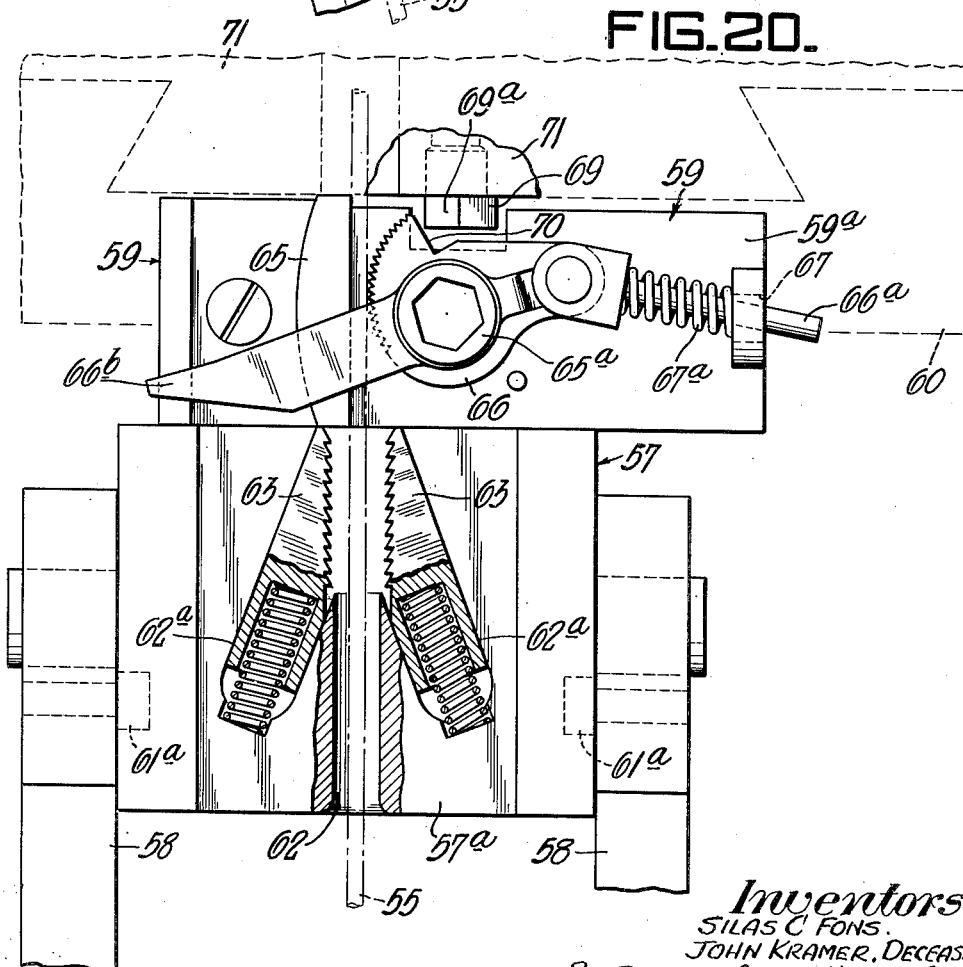

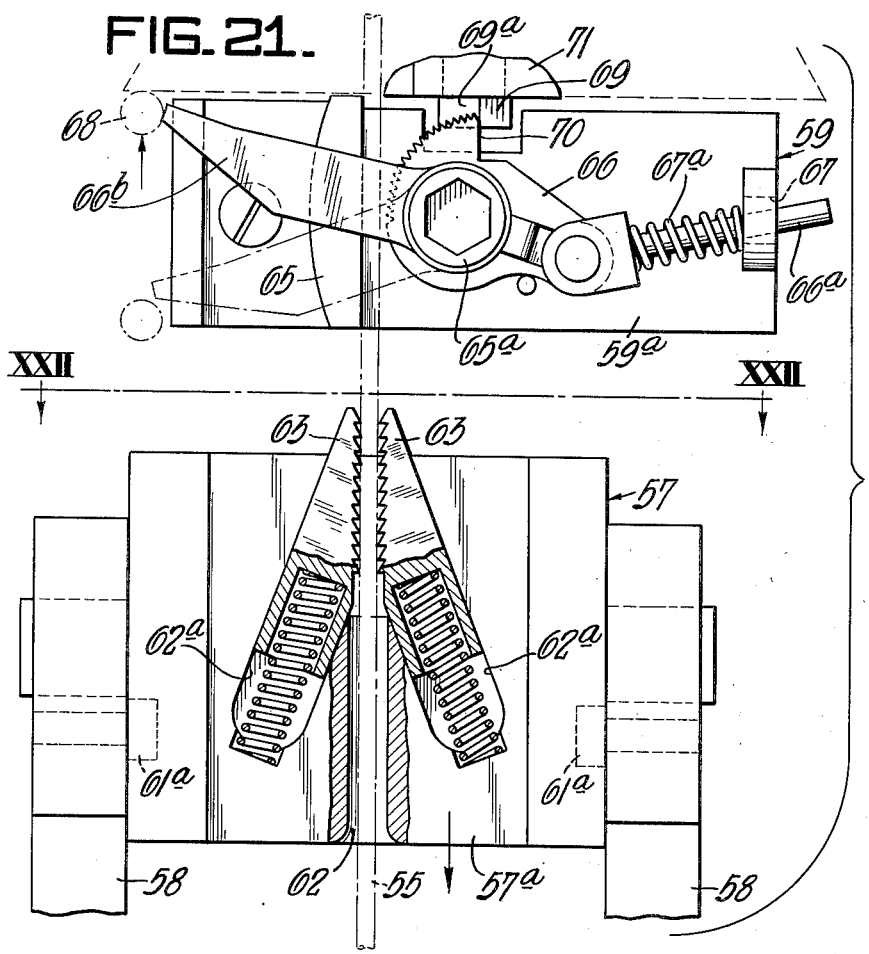
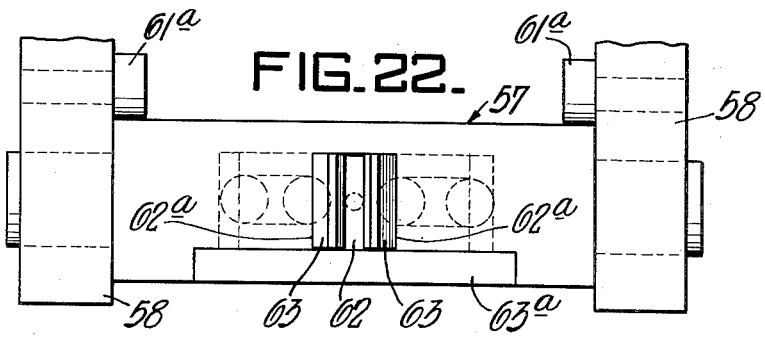

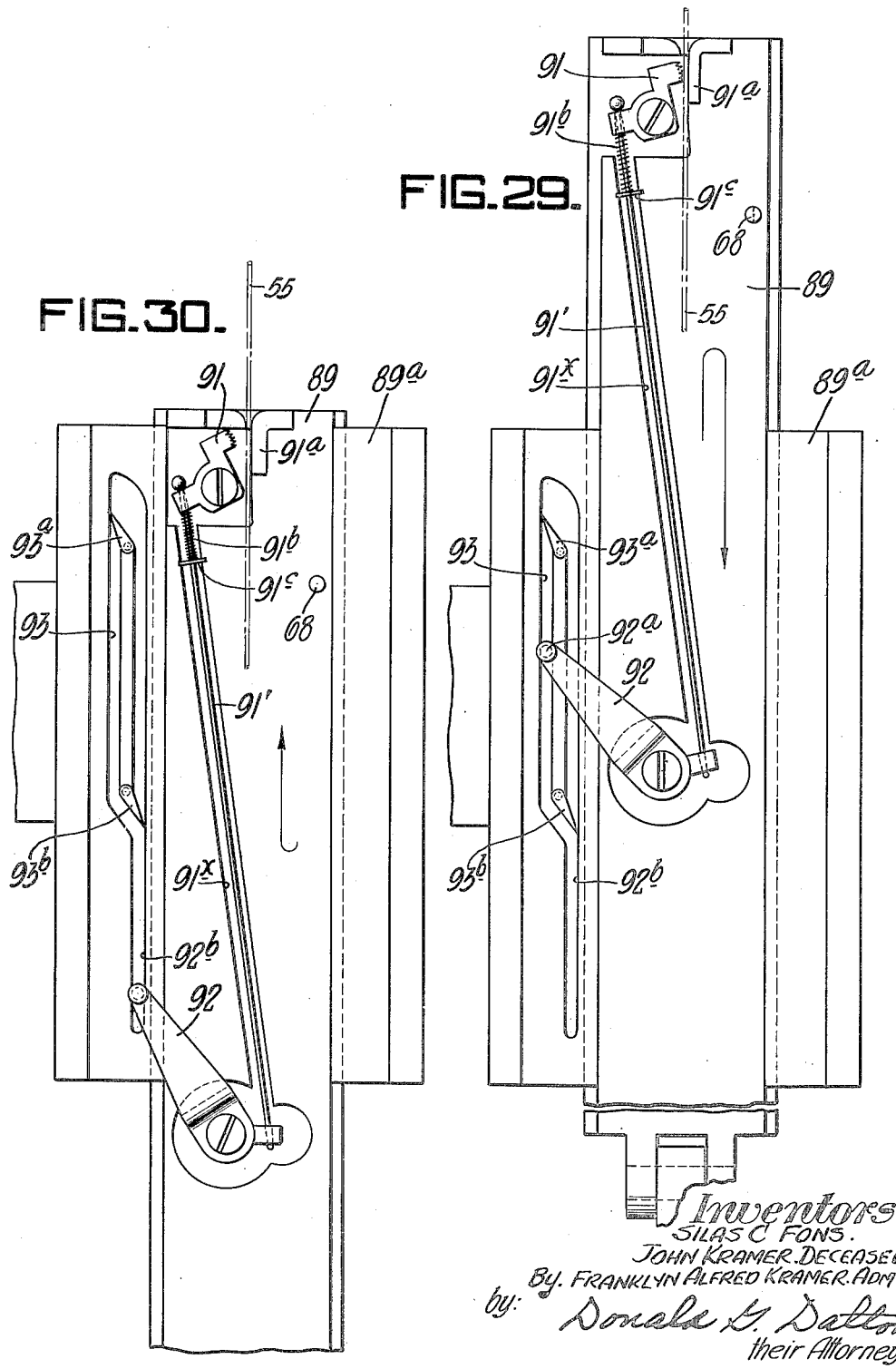

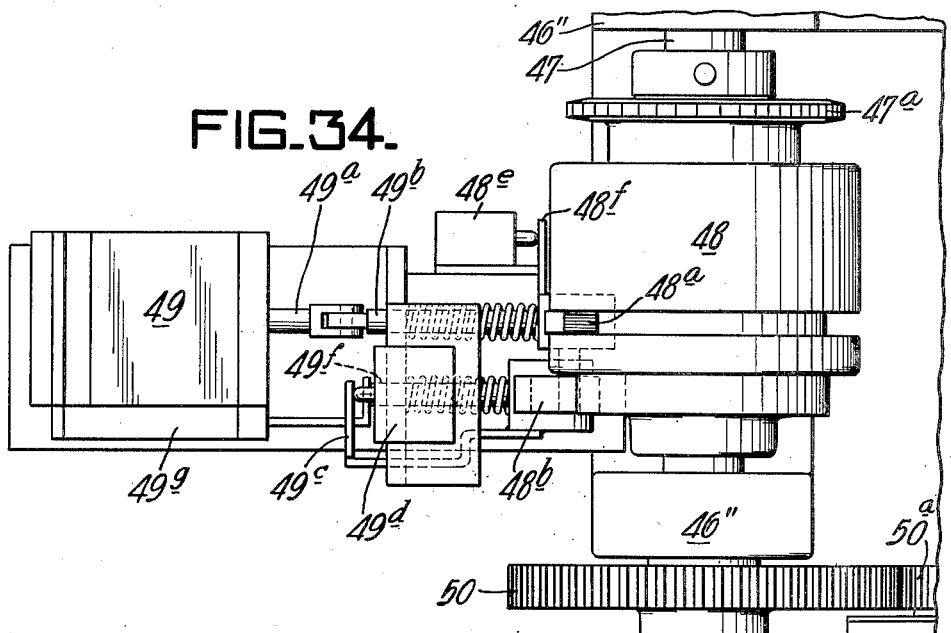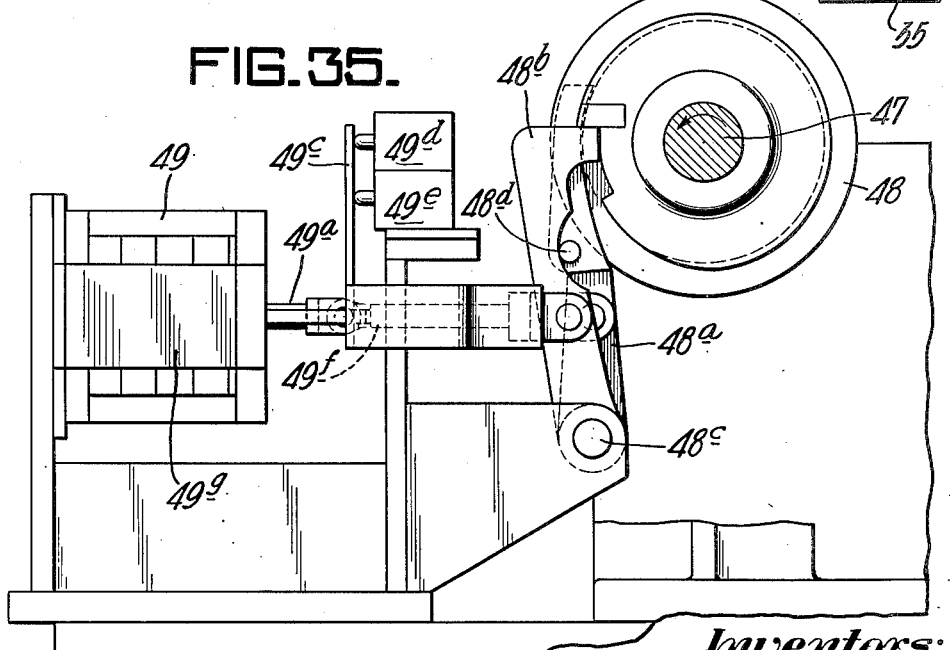

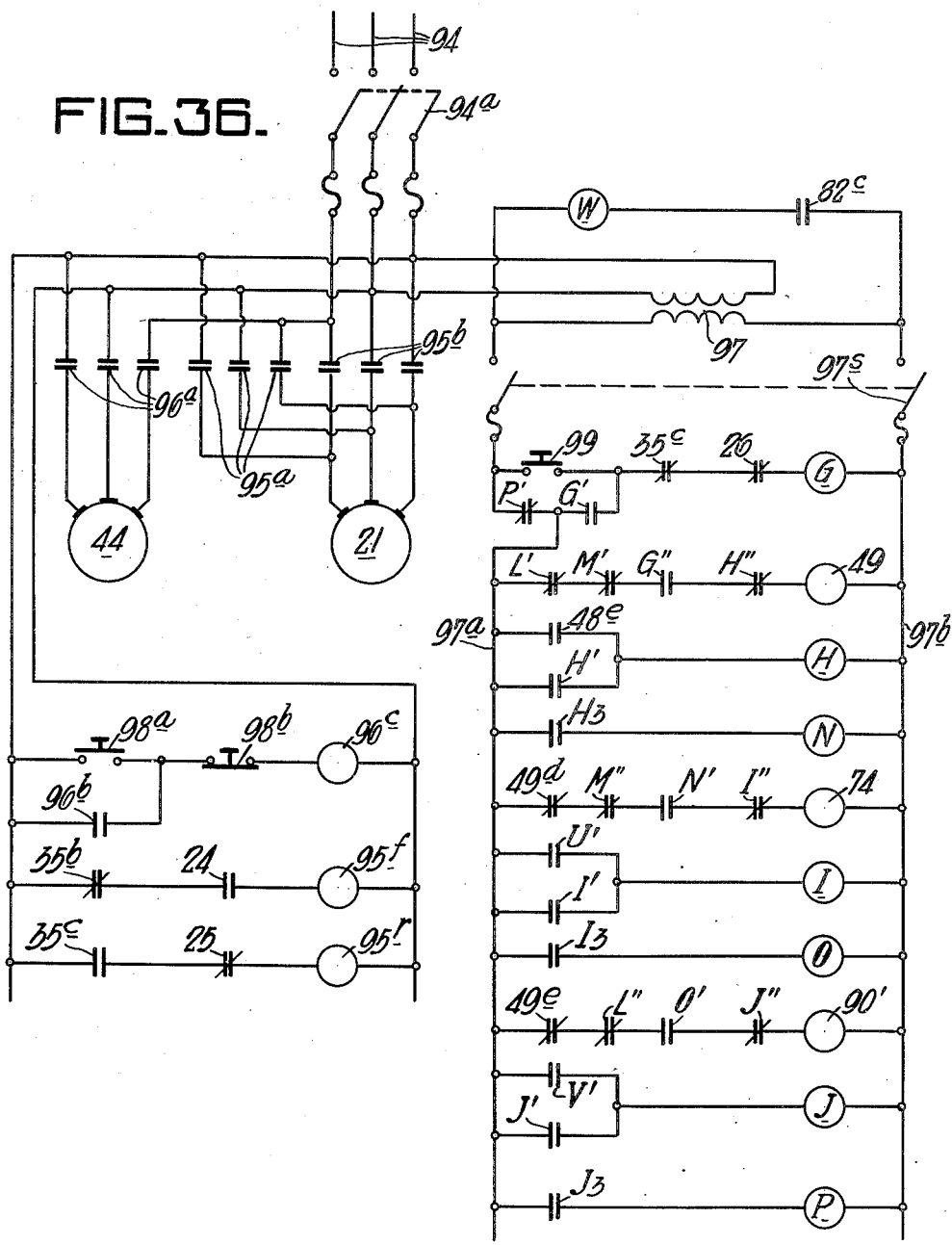

Patented Oct. 13, 1953

2,655,097

UNITED STATES PATENT OFFICE 2,655,097

APPARATUS FOR DRAWING A WIRE TIE THROUGH AND AROUND ANNULAR ARTICLES AND TWISTING THE ENDS TOGETHER

Silas C. Fons, Waukegan, Ill., and John Kramer, deceased, late of Waukegan, Ill., by Franklyn Alfred Kramer, administrator, Waukegan, Ill., assignors to United States Steel Corporation, a corporation of New Jersey Application August 10, 1950, Serial No. 178,702

27 Claims. (Cl. 100—12)

This invention relates to automatic bundle-tying machines and, in particular, to a machine for tying annular bundles such as a coil or bundle of wire, the ties for which must be "threaded" through the continuous ring form in which the bundle is disposed, and wrapped around the section thereof.

Several types of automatic machines are known for tying boxes, bundles and the like having generally the form of a right rectangular prism. Semi-automatic machines are also known for tying annular packages such as coils of strip or wire, but they require manual threading and looping of the tie. The practice of manually tying coils or bundles of wire for handling and shipment has continued to be universal in wire mills, nevertheless, despite the time and effort consumed thereby and the resulting high cost of the tying operation. It is accordingly the object of our invention to provide a fully automatic machine capable of quickly and efficiently performing the threading and tying operation on an annular coil of wire which is known in a wire mill as a bundle.

In a preferred embodiment of the invention, we provide a bundle support and an openable rotatable wrapping ring adjacent thereto adapted to embrace the bundle when laid side down on the support. Manually initiated, automatically controlled means for driving the ring cause it when closed to carry the free end of a wire tie initially held by a gripper on the ring, through the bundle and around the section thereof, the tie being pulled from a continuous coil of wire. An automatic tensioning means is then brought into operation to tighten the tie and a twister head is advanced to seize the crossed overlapping ends of the portion of tie wire thus applied, shear them and twist the newly cut ends together. Thereafter a transfer gripper delivers the freshly cut end of the tie wire leading from the coil thereof to the gripper on the ring preparatory to the next cycle of operations.

Since the various mechanisms involved in our invention are relatively complex, the detailed description of the machine will be sub-divided into sections to facilitate a full understanding. There are several principal mechanisms which are treated in succeeding sections under the following subtitles:

I. The main frame and the elevator table for supporting bundles;
II. The split wrapping ring with its positioning bolt, gripper and drive;
III. The tensioning arm and stationary gripper;
IV. The twister head and its drive;
V. The transfer gripper; and
VI. The automatic control system.

A complete understanding of the invention may be obtained from the following detailed description and explanation which refer to the accompanying drawings illustrating a preferred embodiment. In the drawings, Figure 1 is a side elevation of the apparatus as a whole showing in dotted lines a bundle of wire thereon in position for the application of wire ties with parts omitted for clearness;

Figure 1A is a partial section taken along the plane of line IA—IA of Figure 1;

Figure 2 is a plan view with a part of the bundle-supporting table broken out;

Figure 3 is a side elevation of a portion of Figure 1 to enlarged scale;

Figure 4 is an end elevation of the parts shown in Figure 3, looking from the left;

Figure 5 is a plan of the view of the parts shown in Figure 3;

Figure 8 is a vertical section through the apparatus taken on the plane of line VIII—VIII of Figure 2 (the plane of section is also similarly designated in Figure 5);

Figure 9 is a partial plan view showing the gripper on the wrapping ring and a waste-end pull-out hook cooperating therewith;

Figure 10 is a side elevation of the parts shown in Figure 9 with a part in section;

Figure 11 is a partial end elevation of the parts shown in Figure 10 looking from the right;

Figure 6:
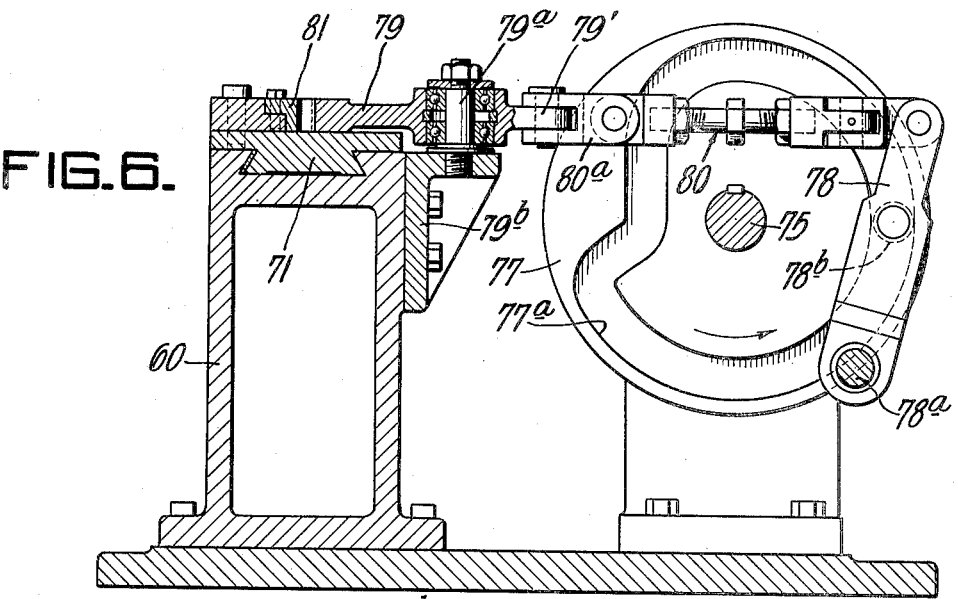
Figures 6 and 7 are transverse sections taken on the planes of lines VI—VI and VII—VII, respectively, of Figure 5.
Figure 7:
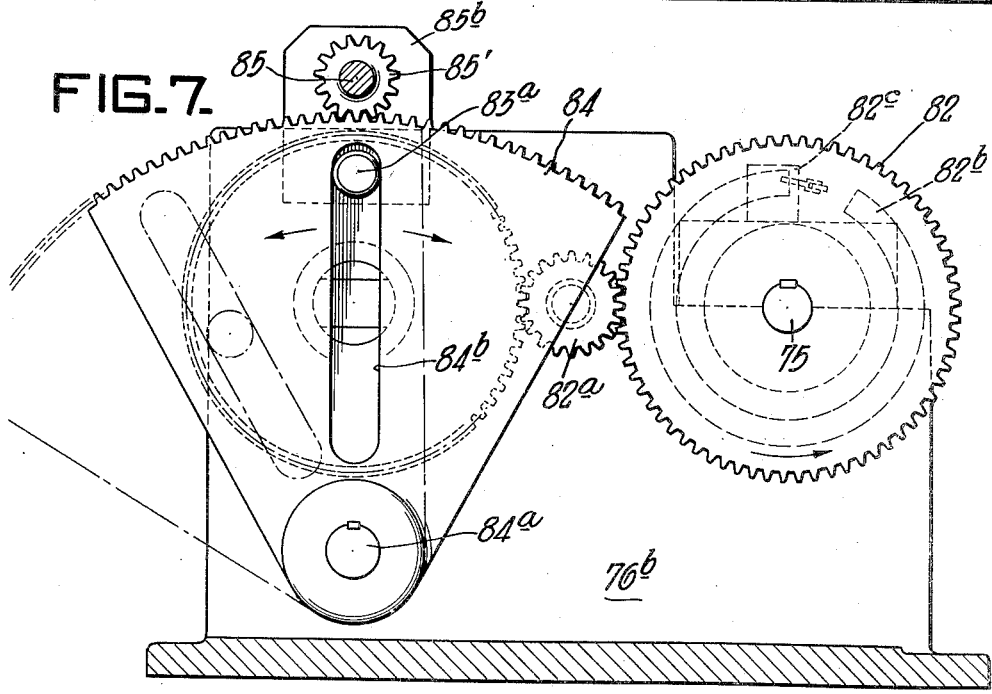
Figure 23:
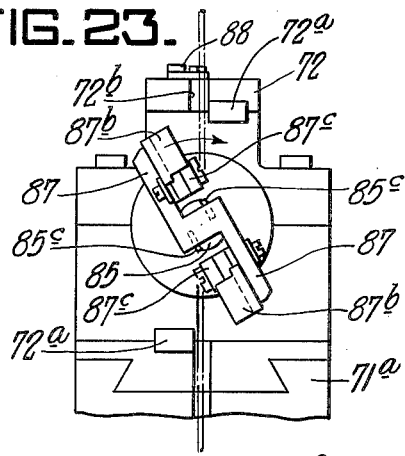
Figure 25:
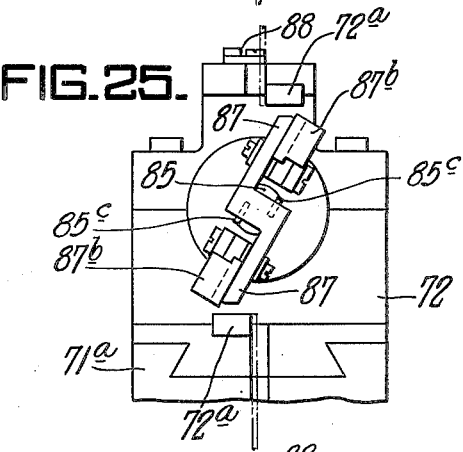
Figure 27:
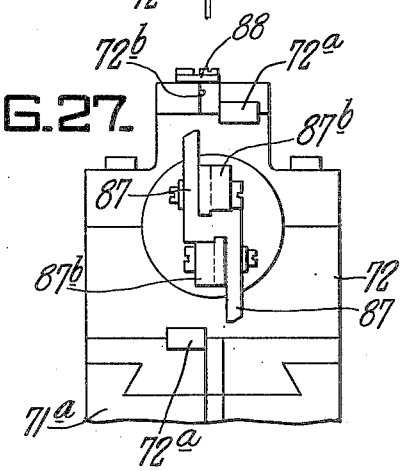
Figure 24:
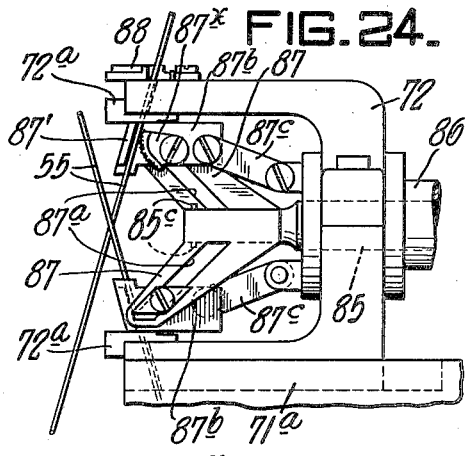
Figure 26:
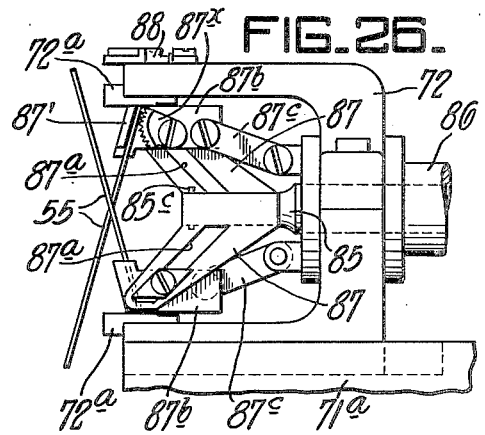
Figure 28:
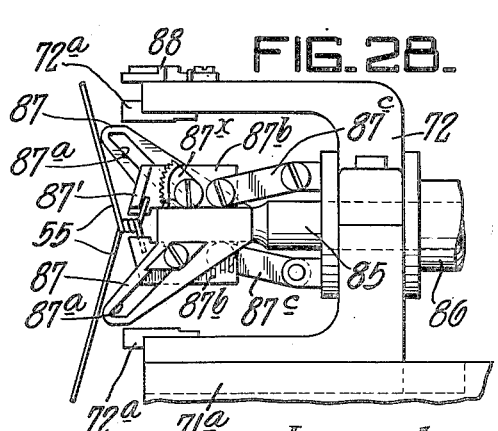

Figures 12 and 13 correspond to Figures 9 and 10 but show the parts at a later stage of operation;

Figures 14 and 15 also correspond to Figures 9 and 10 showing the parts in a further stage of operation;

Figures 16 and 17 also correspond to Figures 9 and 10 but show the parts in a still further stage of their operating cycle;

Figure 18 is a section taken along the plane of line XVIII—XVIII of Figure 17 with parts in elevation;

Figure 19 is a side elevation of the stationary gripper and the gripper on the tensioning arm cooperating therewith;

Figure 20 is an end elevation of the parts shown in Figure 19 looking from the left with a part removed;

Figure 21 is a view similar to Figure 20 showing the parts in a later stage of operation;

Figure 22 is a plan view such as would be projected on the plane of line XXII—XXII of Figure 21;

Figure 23 is an end view of the twister head;

Figure 24 is a partial side elevation thereof;

Figures 25 and 26 correspond to Figures 23 and 24 but show a later stage of the operation thereof;

Figures 27 and 28 also correspond to Figures 23 and 24 but show a still further stage of their operation;

Figure 29 is a bottom plan view of the transfer gripper showing the reciprocating slide on which it is mounted;

Figure 30 is a view similar to Figure 29 showing the parts in alternate positions;

Figure 31 is a plan view showing the transfer-gripper slide and its cooperation with the tensioning-arm gripper;

Figure 32 is a side elevation thereof;

Figure 33 is an end elevation such as would be projected on the plane of line XXXIII—XXXIII of Figure 32;

Figure 34 is a plan view of a single-revolution clutch and its operating magnet adapted to effect a predetermined cycle of operations at a particular stage in the overall sequence;

Figure 35 is a side elevation thereof; and

Figure 36 is a circuit diagram showing the electrical control system of the machine.

I. *The main frame and elevator table (Figures 1 and 2)*

The apparatus of our invention is mounted on a frame 10 including an upper deck 11, legs 12 and a lower deck 13, fabricated from plate and structural shapes in any suitable manner. An elevator table 14 is carired on the upper ends of four vertical rack bars 15. The table has bearing balls 14a in its upper surface arranged in radial groups of rows, to facilitate spotting the bundle properly thereon. The rack bars are slidable in bearings 16 secured to the upper deck 11 adjacent the corners of the table. Horizontal cross-shafts 17 are journaled in the front and rear pairs of bearings 16 and each has pinions 18 thereon meshing with one pair of the bars 15. The shafts 17 are driven by a longitudinal shaft 19 journaled in bearings 19a secured to the lower surface of the upper deck 11. Shaft 19 has spaced worms (not numbered) thereon meshing with worm wheels 20, one on each shaft 17.

Shaft 19 is driven by a motor 21 mounted on a bracket 22 secured to frame 10, through a chain-and-sprocket drive 23. Limit switches 24 and 25 (omitted from Figure 1 for clearness) stop the motor when the table has reached the upper and lower extremities of its movement, shown in dotted and solid lines, respectively, in Figure 1. The motor has a standard electro-magnetic brake 21a with a drum and spring-loaded brake shoe to ensure prompt stopping thereof. When the table is in its uppermost or loading position and the split wrapping ring (described in the next section) is opened, a bundle B may be easily placed thereon in position to be embraced by the ring on closing thereof. In this position the table is slightly above the ends of the lower half of the wrapping ring. The descent of the table to its lowermost or tying position brings the bundle into proper position relative to the ring to have a wire tie wrapped around it after the split wrapping ring is closed. In this position the table is approximately tangent to the wrapping ring and operates a third limit switch 26 mounted on deck 11 below the table (see Figures 2 and 8).

II. *Split wrapping ring with its positioning bolt, gripper and drive (Figures 1, 1A, 2, 8 through 11, 34 and 35)*

Table 14 has a slot 27 extending inwardly from the rear edge to clear the wrapping ring indicated generally at 28, which is carried on upper deck 11 of the frame 10. The ring 28 comprises a pair of opposed guide rings 29 and 30 (see Figure 1A) and the wrapping ring proper in the form of a ring gear 31 rotatable therein, all of which are divided along a plane through their common center. The guide rings have circular grooves 32 in their adjacent faces and the gear 31 has flanges 33 cooperating therewith. The gear extends throughout 360° and is normally positioned so its plane of separation coincides with that of the guide rings.

The lower halves of the guide rings are bolted to a vertical plate 34 upstanding on deck 11, the upper edge of the plate having the shape of a circular arc. Plate 34 is secured to deck 11 by means of angle brackets bolted thereto. The upper halves of the guide rings are secured to a tiltable lever arm or walking beam 35 having a counterweight 35a at the far end thereof. The beam has a leg 36 extending downwardly therefrom which is pivoted on shaft 36a journaled on a bearing post 37 standing on deck 11. In the uplifted position of the upper half of ring 28, the beam 35 operates a cam switch 35b. When the ring is closed as shown in Figure 2, beam 35 operates a cam switch 35c. The upper half of the ring 28 is normally secured to the lower half by a manually releasable latch 38. The ring gear has axial dowel pins or keys 39 in the ends of one half cooperating with grooves in the ends of the other half to insure proper alignment when they are brought into engagement.

Since the ring gear 31 is rotatable in the guide rings, it must have its plane of separation accurately aligned with that of the guide rings in order to permit opening of the ring as a whole by tilting the walking beam to raise the upper half. To this end, we provide a centering block 40 on one side of the gear having a beveled notch in the outer edge thereof adapted to be engaged by a radial centering and locking bolt 41, the forward end of which is shaped to conform to the notch. The bolt is slidable in a guide 42 secured to plate 34. A single-acting pneumatic cylinder 43 mounted on the deck 11 has its piston rod connected to a block 43a on the outer end of the bolt. Air admitted to the outer end of the cylinder normally urges the piston rod and bolt to the positions shown in Figures 1 and 8. When it is desired to permit rotation of the ring gear, the bolt is retracted by releasing air from the outer end of the cylinder 43. A tension spring in the cylinder thereupon retracts the piston. When the gear has completed the desired number of revolutions, air is again supplied to the outer end of cylinder 43 to reset the bolt in locking position. The shape of the forward end of the bolt and the sides of the notch in block 40 causes the bolt to align the plane of division of the gear accurately with that of the guide rings in case the gear stops in a position of slight misalignment.

The ring gear 31 is driven by a motor 44 mounted on a bracket 44a secured to the rear side of the frame 10. The motor drives a reduction gear 45 through a chain-and-sprocket drive 45a. The reduction gear drives a cross-shaft 46 journaled in bearings 46′ below the deck 11, through a chain-and-sprocket drive 46a. Shaft 46 drives a shaft 47 journaled in bearings 46″ upstanding on deck 11, through a chain-and-sprocket drive 47a. A single-revolution clutch 48 of known construction is mounted on shaft 47 and is controlled by a solenoid 49. The clutch 48 is shown to an enlarged scale in Figures 34 and 35. As there shown, the plunger 49a of the solenoid is pivotally connected to the restoring lever 48a of the clutch by a link 49b. The restoring lever and a release and arresting lever 48b are pivoted on a common pin 48c mounted in a bracket on the clutch base. A pin 48d on lever 48a trips lever 48b when lever 48a is pulled out. A finger 48f on link 49b simultaneously operates a push switch 48e. A finger 49c on lever 48b operates push switches 49d and 49e. A plunger 49f pivoted to lever 48b operates a valve 49g. The functions of these control devices will be explained later. The input end of the clutch 48 is driven continuously. The output end of the clutch has a gear 50 thereon. The clutch operates in the known manner to cause a single revolution of this gear when the lever 48a is pulled to the left by the solenoid. Gear 50 meshes with a pinion 50a keyed on shaft 36a journaled in bearing post 37. A gear 51 keyed on the shaft 36a meshes with ring gear 31. The ratios of the several gears and the pinion are such that gear 31 is driven through two revolutions for each revolution of gear 50.

The ring gear 31 has a traveling gripper mounted thereon in the form of a block 52 (Figures 9 to 11) having a portion 52a overhanging the adjacent guide ring 30 and provided with a fixed jaw 53 projecting therefrom. A movable jaw 54 in the form of a toothed eccentric sector is pivoted on the end of the portion 52a for cooperation with the jaw 53 to seize the end of a tie wire 55 therebetween. The jaw 54 has an actuating pin 54a projecting from one edge thereof for a purpose which will appear later. On rotation of the gear 31, the tie wire 55 is drawn from a coil thereof (not shown) through a guide tube 56 secured in the frame 10.

III. The tensioning arm and stationary holding gripper (Figures 1, 3, 8 and 19 through 22)

The portion of wire 55 between the inner end of tube 56 and gripper 52 passes through a pullback gripper 57 carried on a pivoted tensioning arm 58 and a stationary holding gripper 59 mounted on the upper end of an interior frame 60. This frame is mounted in frame 10 on a diagonal plate 60a secured to brackets 60b attached to the upper and lower decks 11 and 13. Gripper 57 comprises a block 57a pivoted between the bifurcated upper end of an arm 58 pivoted on a pin 58a in frame 60. The block 57a is normally held in the position shown in Figure 8, i. e., against stop pins 61a in the bifurcated end of arm 58 by a tension spring 61. The block 57a has a passage 62 therethrough for the wire. Angularly-related recesses 62a intersecting the upper end of passage 62 accommodate cooperating spring-pressed toothed gripper jaws 63. The jaws are confined in their recesses by a cover plate 63a secured to block 57a. The ends of these jaws are adapted to project above the upper face of block 57a when the latter is withdrawn from gripper 59, as shown in Figure 21, and thereby make gripping engagement with the wire. When the arm 58 is in the position shown in solid lines in Figure 8, however, the engagement of the upper ends of jaws 63 with the lower face of gripper 59 pushes the jaws downwardly in their recesses causing them to spread to the positions shown in Figure 20 thus freeing the wire for further feeding.

After the free end of wire 55 has been carried around bundle B on table 14, the tensioning arm 58 is pulled downwardly to the dotted line position shown in Figure 8, thus tightening the tie preliminary to cutting the two ends thereof and twisting them together. This down-tilting movement of the arm 58 is effected by a double-acting pneumatic cylinder 64 on deck 13, the piston rod 64a of which is connected to arm 58 by a link 64b. From the explanation just given, it will be understood that the jaws 63 grip the wire for applying back tension thereto as soon as the block 57a moves away from the gripper 59.

Stationary holding gripper 59 as shown in Figures 19 through 21 comprises a block 59a having a shoulder 65 outstanding therefrom which serves as a stationary jaw and a movable jaw 66 in the form of an eccentric toothed sector pivoted on a screw 65a in the block cooperating with jaw 65 to seize the wire 55, as clearly shown in Figure 20. The jaw 66 is movable from gripping position to the released position shown in Figure 21. It is held in one position or the other by a toggle including a pin 66a pivoted thereto and slidable in an eye 67 at one end of block 59a. A helical spring 67a is compressed between the eye and the head of pin 66a. The jaw 66 is turned clockwise by a pin 68 indicated in Figure 21 adapted to engage a finger 66b rigid with the jaw. The mounting and travel of the pin will be more fully described later. The jaw is moved to the closed position shown in Figure 20 by a pin 69 having an inclined face 69a adapted to engage one side of a notch 70 in jaw 66. Pin 69 is mounted in a slide 71 reciprocable in ways formed on frame 60 as is shown in Figures 3, 4 and 8.

IV. The twister head and its drive (Figures 1, 3 through 8 and 23 through 28)

The mechanism for cutting and twisting the ends of a wire tie wrapped around the bundle B and brought into crossed relation as shown in Figure 8 is mounted on the slide 71. A U-shaped twister head 72 is slidable in ways on a plate 71a secured to slide 71. The head is split along a plane parallel to the slide and has spaced opposed cutters 72a thereon. The mechanism for reciprocating the slide and operating the twister head is driven by a single-revolution clutch 73 similar to that shown at 48 and controlled by a solenoid 74 pivotally connected to the restoring lever 73a thereof. The clutch 73 is journaled on a bearing post 74a and is driven from the reduction gear 45 by a chain-and-sprocket drive 73b. The clutch 73 drives a shaft 75 (Figure 5) through a chain-and-sprocket drive 75a and helical gears 76. The shaft 75 is journaled in bearings carried by a post 76ª and a web 76ᵇ upstanding on plate 60ª. A side cam 77 having a groove 77ª in one side thereof is secured to shaft 75. A lever 78 (Figure 6) pivoted at 78ª on post 76ª has a follower roller 78ᵇ extending into the groove 77ª.

A gear sector 79 is pivoted for oscillation in a plane parallel to that of plate 60ª on a pin 79ª secured to a bracket 79ᵇ mounted on frame 60. Sector 79 has an operating arm 79' integral therewith extending at an angle thereto. A link 80 is pivoted to the lever 78 and arm 79' and includes universal joints 80ª and a turnbuckle for adjustment. Sector 79 meshes with a rack bar 81 secured to slide 71. Reciprocation of the latter is thus effected by oscillation of lever 78 which is determined by the shape of the groove 77ª in cam 77. A gear 82 on shaft 75 drives a gear 83 through an idler pinion 82ª journaled on a stub shaft fixed in web 76ᵇ. Gear 82 has a cam ring 82ᵇ extending around about 330° of its circumference. This ring operates a switch 82ᶜ for a purpose which will appear later. A gear sector 84 journaled on a stub shaft 84ª also fixed on web 76ᵇ has a radial slot 84ᵇ. The gear 83 has a crank pin 83ª which fits in slot 84ᵇ to cause oscillation of the sector on rotation of gear 83.

A twister spindle 85 (Figures 3, 5 and 8) is journaled in a bearing 85ª mounted on plate 71ª and a bearing 85ᵇ secured to web 76ᵇ. The spindle is free to slide in the latter bearing. An elongated pinion 85' meshes with sector 84, the length of the pinion being sufficient to maintain driving relation with the sector in all positions of the spindle. A thrust collar 85ˣ is pinned to spindle 85 so that the latter will move with bearing 85ª on movement of slide 71. A coupling 85ᵈ on the opposite side of bearing 85ª from collar 85ˣ also serves as a thrust bearing. Spindle 85 extends through a sleeve 86 rotatable in a bearing 86ª in twister head 72, and is keyed thereto. The lower end of the sleeve extends beyond the bearing as at 66ᵇ and is threaded for cooperation with a nut in the form of a tapped hub 86' secured to bearing 85ª. When slide 71 is in retracted position, the threaded end of sleeve 86 is turned nearly home in the hub, but not quite. When the slide is advanced, the sleeve is screwed partially out of the hub as the spindle is turned backwardly preparatory to twisting together the ends of the tie. Prior to the retraction of the slide 71 (as will be later explained), the screwing of the sleeve into the hub causes a slight initial axial movement of head 72 on slide 71ª. This moves the head 72 away from the bundle as the twist is formed and causes the twister grippers next to be described, to approach each other as the wire ends are used up in the twist.

Opposed parallel wings 87 extend laterally from the upper end of spindle 85 (Figures 23 and 24). Each wing has a slot 87ª inclined to the axis of the spindle. A block 87ᵇ is slidable along the slot in each wing but non-rotatable thereon. Each block has a jaw 87' at the outer end. A movable jaw in the form of a toothed eccentric sector 87ˣ is pivoted adjacent each jaw 87' for cooperation therewith. The jaws 87ˣ are constantly urged toward closed position by small torsion springs (not shown). Both jaws 87' and 87ˣ have their exposed faces beveled so that as the grippers approach a tensioned tie-wire end on reversal of spindle 85, the jaws 87ˣ are forced to turn so as to move away from jaws 87', to permit entry of the wire end after which it is firmly held between the jaws. The outer edges of the blocks cooperate with cutters 72ª in a manner to be described later, to shear the crossed ends of wire tie 55 after they have been seized by the grippers constituted by jaws 87' and 87ˣ. Blocks 87ᵇ are connected to sleeve 86 by pivoted links 87ᶜ and are thus actuated in slots 87ª by relative axial movement between the sleeve and spindle 85, caused by the rotation of the sleeve in hub 86'. When the blocks have reached their innermost positions, jaws 87ˣ are opened by pins 85ᶜ.

A waste-end retractor hook 88 is mounted on top of head 72, as more clearly shown in Figures 9 through 13, to pull out the free upper end of the tie after it has been cut off. The hook cooperates with a slot 72ᵇ in the end of the upper portion of the head. The hook is pivoted on the head by a screw 88ª and has a raised beveled forward edge 88ᵇ which strikes pin 54ª on jaw 54 of gripper 52 when the head is advanced, thus tilting the hook as shown in Figure 12, to cause it to engage the tie end with its inner edge 88ˣ and hold the end in slot 72ᵇ as shown in Figures 16 and 17. The hook 88 also has a cam surface 88' which, on the return of slide 71 engages pin 54ª of jaw 54, thus tilting it to released position and permitting withdrawal of the waste end of the wire tie by the hook. On retraction of the slide 71, the waste end drops into a chute 72ᶜ (Figure 1).

V. *The transfer gripper (Figures 1, 29 and 30)*

A slide 89 is reciprocable in ways formed in a guide plate 89ª, by an arm 89ᵇ pivoted on deck 13. A connecting link 89ˣ between the arm and slide includes a universal joint at each end. Plate 89ª is normal to plate 60ª and when slide 89 is retracted, its upper end is adjacent gripper 59. Arm 89ᵇ is actuated by a single-revolution clutch 90 including a disc 90ª having a crank pin cooperating with a longitudinal slot in the arm. The clutch 90 is similar to those shown at 48 and 73. It is driven from shaft 46 through a chain-and-sprocket drive 90ᵇ and is controlled by a solenoid 90' in the same manner as clutches 48 and 73.

As shown in Figures 29 and 30, slide 89 has a recess at its upper end in which is mounted a pivoted gripper jaw 91 cooperating with a fixed jaw 91ª. The jaw 91 is urged toward the jaw 91ª by a spring 91ᵇ on a pull rod 91' working in a slot 91ˣ in the under surface of the slide. The spring bears on a disc 91ᶜ fixed in the slot, having a hole therein for the rod. The pull rod is secured to one end of a bell crank 92 pivoted to the slide. The other end of the crank has a follower 92ª riding in a groove 92ᵇ and a parallel groove 93 communicating therewith at its ends. Spring closed switches 93ª and 93ᵇ divert the follower from groove 92ᵇ to groove 93 on the ascending stroke and vice versa on the descending stroke. The resulting tilting of crank 92 controls the movement of jaw 91. After the completion of a tie, the transfer gripper serves in a manner to be explained more fully later, to seize the freshly cut end of the tie wire held by gripper 59, carry it upward toward gripper 52 and insert it between the fixed and movable jaws 53 and 54 thereof.

Slide 89 also serves to actuate gripper 66, pin 68 (Figure 21) being mounted on the under surface of the slide as shown in Figures 29 and 30. When the tie 55 is tightened, gripper 66 is moved by pin 69 on slide 71 from the position shown in Figure 21 to that shown in Figure 20, to hold the tie under tension during twisting of the ends. After the tie ends have been cut and twisted together, gripper 66 must be restored to the position of Figure 21 to permit the transfer gripper 91 to carry the freshly cut end of the tie wire from the coil thereof to the wrapping-ring gripper 52. This is effected by pin 68, as best shown in Figures 21 and 31 through 33. The tensioning gripper 59 is at a small angle to the line of travel of slide 89. The wire end protruding from gripper 59 is thus in position to be seized by transfer gripper 91 as it moves from open to closed position on passage of follower 92$^a$ from groove 92$^b$ into groove 93, as slide 89 moves upward. Just before gripper 91 closes, pin 68 strikes the tip of finger 66$^b$ and opens gripper 66. Pin 68 is undercut as shown at 68$^a$ (Figure 33). The pin thus clears the finger on retraction of the slide because, as a result of the angle between the slide and gripper 59, after actuation of the finger 66$^b$ to the dotted-line position of Figure 33, its tip is in line with the deepest portion of the undercut 68$^a$ (nearest slide 69) instead of with the extremity of the pin as when in the solid-line position, where the undercut is a minimum.

VI. The automatic control system

The complete cycle of operations of the machine described above will be explained in connection with the description of the automatic control system shown in Figure 36. Several of the elements thereof have already been referred to in describing the machine and are designated by the numerals previously employed. The additional elements of the system are conventional switches, contactors, relays, etc. Electric power for the motors 21 and 44 is supplied from a three-phase line 94 through the usual disconnect switch 94$^a$. A reversing contactor controlling motor 21 has two sets of contacts 95$^a$ and 95$^b$ and forward and reverse operating coils 95$^f$ and 95$^r$ for closing the contacts of the two sets, respectively. A contactor controlling motor 44 has contacts 96$^a$ and an operating coil 96$^c$. A control bus 97$^a$, 97$^b$ is energized from line 94 by a step-down transformer 97 through a disconnect switch 97$^s$. Manual start and stop buttons 98$^a$ and 98$^b$ control contactor coil 96$^c$. When the coil is energized by pressing button 98$^a$, contacts 96$^a$ are closed and also an auxiliary contact 96$^b$ shunting the contacts of button 98$^a$ to hold the coil continuously energized until stop button 98$^b$ is pressed to open its normally closed contacts. Coils 96$^c$, 95$^f$ and 95$^r$ are energized from one phase of line 94.

The following description of a complete cycle of operations assumes that, at start, the table 14 is in uppermost position, the wrapping ring 28 is open, a wire-bundle B is on the table, the main line switch 94$^a$ is closed and the start-stop button 98$^a$ has been actuated to start the tying motor 44. Auxiliary control relays, not yet referred to, will be mentioned in the order of their operation. These control relays are designated by capital letters in Figure 36 and the contacts actuated thereby are indicated by the same letters with prime marks affixed. Clutches 73 and 90 have switches corresponding to switches 48$^e$, 49$^d$ and 49$^e$ of clutch 48 but they have not been mentioned previously. They are therefore designated by letters in Figure 36.

With the table 14 in its uppermost position and the wrapping ring 28 open, the contacts of wrapping-ring cam switch 35$^b$ are closed and the contacts of the upper table limit switch 24 are open, while the contacts of the ring cam switch 35$^c$ are open and the contacts of lower table limit switch 25 are closed. The contacts of the second or safety lower table limit switch 26 are open.

The closing of the wrapping ring causes cam switch 35$^c$ to close its contacts. Since the contacts of lower table limit switch 25 are closed, this causes operating coil 95$^r$ to be energized thus starting the table motor 21 and lowering the table. The table descends until it strikes the lower limit switch 25 opening its contacts which in turn open the circuit of coil 95$^r$ thus stopping the table motor 21. The solenoid-operated brake 21$^a$ on the table motor stops the table at the correct operating position. The lowering of the table to its wrapping position also actuates the second lower table limit switch 26 and closes its contacts.

With the table in its lowermost position and the contacts of switches 26 and 35$^c$ in the circuit of control relay G closed, the tying operation can be started by pressing a push button 99. A resetting time-delay relay P will have been previously de-energized so that its back contacts P' have been closed leaving the entire control circuit in the normal or starting position as shown in Figure 36. Contacts 26 and 35$^c$ being closed, the pressing of starting button 99 will energize control relay G which will seal in through contacts P' and G', the latter being front contacts of relay G.

Solenoids 74 and 90' are de-energized so their contacts L' and M' (corresponding to switch 48$^e$ of solenoid 49) are closed. Relay H remains de-energized so its back contact H'' is closed. Thus the closing of contact G'' by energization of relay G will close the circuit of solenoid 49. This actuates clutch 48 which drives the wrapping ring 28 through gear 50, pinion 50$^a$ and gear 51, whereby gripper 52 draws two wraps of tie wire 55 around the bundle after which the clutch stops itself. Energization of solenoid 49 opens the contacts of switches 49$^d$ and 49$^e$, thus preventing energization of solenoids 74 and 90' during operation of clutch 48. Energization of solenoid 49 also closes switch 48$^e$ which energizes control relay H. This relay seals in through its front contact H' and opens the circuit of solenoid 49 at contact H'', preventing further operation of clutch 48. On completion of the wire wrapping effected by ring 30, clutch 48 is restored to normal and contacts 49$^d$ and 49$^e$ are closed. Relay H being energized closes contact H$_3$ and energizes a time-delay relay N which closes its contacts N' after a predetermined time lapse. This energizes solenoid 74 of clutch 73, since switch 49$^d$ and switch M'' operated by solenoids 49 and 90' are closed as well as contacts I' of relay I which is still de-energized.

The energization of solenoid 74 closes contacts U' of a switch corresponding to switch 48$^e$ and also opens contacts L' and L'' corresponding to switches 49$^d$ and 49$^e$ to prevent energization of solenoids 49 and 90. Clutch 73, through gears 76 drives shaft 75 thus operating crank 79' and sector gear 84. The start position of gear 84 is shown in chain lines in Figure 7. The crank, by virtue of the longer inclined portion of the cam groove 77$^a$, advances slide 71$^a$ while the gear drives spindle 85 in the reverse of wire-twisting operation. As soon as shaft 75 starts to turn, switch 82$^c$ is actuated by cam 82$^b$ and completes the circuit of solenoid W which controls the valve of air cylinder 64. Arm 58 is thereby pulled down to tighten the tie wire (see Figures 3 and 8) and the tension applied is maintained until the wire is seized by grippers 87$^x$ and sheared.

As the slide 71ª advances, pin 69ª on the slide closes gripper 66 to hold the tension applied to the tie wire. Continued rotation of spindle 85 causes bushing 86 to screw out of hub 86', thereby moving jaws 87' and 87ˣ outwardly along slots 87ª. As the slide reaches the upper limit of its stroke, sector gear 84 reaches the limit of its oscillation and jaws 87' are moved into line with the crossed ends of the tie (see Figure 24). On reverse movement of gear 84, the spindle 85 reverses and these ends are first gripped between jaws 87' and 87ˣ and then sheared off by cutters 72ª. After shearing, the gripper jaws hold the tie tight and continued rotation of spindle 85 twists the tie ends together. Slide 71ª remains stationary during this period (cam roller 78ᵇ riding in the dwell or circular portion of its groove) but rotation of the spindle causes bushing 86ᵇ to screw into hub 86'. This causes twister head 72 to move on slide 71ª so that its jaws move inwardly along slots 87ª as the tie ends are twisted. Finally, jaws 87ˣ engage pins 85ᶜ and release the tie ends. At that time, the shorter inclined or retreat portion of cam groove 77ª becomes effective to restore slide 71ª to starting position. As gear 82 returns to starting position, switch 82ᶜ is opened and solenoid W is de-energized causing arm 58 to be restored to normal position.

Energization of solenoid 74 closes contacts U' (corresponding to switch 48ᵉ). This energizes relay I which seals in through contacts I' and de-energizes solenoid 74 by opening contacts I'', preventing a repeat operation of clutch 73. Relay I also closes contacts I₃ energizing a time-delay relay O. After a predetermined time, relay O closes contacts O' energizing solenoid 90' since clutch 73 has been restored to normal position closing contacts L' and L'', and contacts J'' are closed because relay J has not yet been energized. On energization of solenoid 90', clutch 90 is actuated and arm 89ᵇ reciprocates slide 89. As the slide advances, jaw 91 grips the freshly cut end of the tie wire against jaw 91ª and inserts it between jaws 53 and 54 of wrapping-ring gripper 52 (see Figure 11) preparatory to the next wrapping operation. As the slide advances, pin 68 moves jaw 66 to released position. Finally, the slide engages the newly formed tie and bends it toward the interior of the bundle B, so it will be out of the way. On retraction of slide 89, jaw 91 releases the wire.

Energization of solenoid 90' as aforesaid, opens contacts M' and M'' (corresponding to switches 49ᵈ and 49ᵉ) temporarily locking out solenoids 49 and 74. Solenoid 90' when energized also closes contacts V' (corresponding to switch 48ᵉ). This energizes relay J which seals itself in and opens the circuit for solenoid 90' at contacts J'', preventing a repeat operation of clutch 90. Relay J at contacts J₃ energizes slow-release relay P which opens contacts P', thereby opening the circuit of relay G, and also cutting off voltage from relays H, I and J de-energizing them and causing these contacts to be restored to normal or starting condition. Relay P is thus, in turn, de-energized by the opening of contacts J₃ and, after a predetermined time, recloses contacts P' in preparation for the next cycle.

If it is desired to make additional ties on bundle B, it is only necessary to push starting button 99 again which will initiate the above-described sequence of operations consisting of wrapping, twisting and transferring. When the proper number of ties have been applied to the bundle, it is only necessary to open wrapping ring 28 which will actuate cam switch 35ᵇ thus closing its contacts. Since the contacts of upper table limit switch 24 are closed, operating coil 95ᶠ will be energized thus starting the table motor 21, raising the table 14. The table will travel upward until it strikes the upper table limit switch 24 thus opening its contacts which will open the circuit of operating coil 95ᶠ and stop the table motor. The brake 21ª stops the table at the correct unloading position. The bundle may then be removed from the machine and the table remains in the raised position with the wrapping ring open, ready to receive the next bundle to be tied.

We claim:

1. Apparatus for inserting a wire tie through an article in the form of a closed ring, comprising a vertically disposed guide ring divided along a horizontal plane through its center, a fixed support for the lower half of said ring, the upper half being movable from and toward the lower half, a wrapping ring rotatably mounted on said guide ring, said wrapping ring being divided along a diameter, an article-supporting table adjacent said guide ring, and means mounting said table for vertical movement from an upper loading position adjacent the ends of the lower half of the guide ring to a lower tying position approximately tangent to the wrapping ring.

2. The apparatus defined by claim 1 characterized by said table-mounting means including vertical rack bars, shafts having pinions thereon meshing with said bars and common driving means for said shafts.

3. Apparatus for inserting a wire tie through an article in the form of a closed ring, comprising a wrapping ring divided along a diameter, a guide ring supporting the wrapping ring for rotation in its plane, the guide ring being divided along a diameter, the wrapping ring having gear teeth around the periphery thereof, a fixed support for one half of the guide ring, a member pivoted on an axis normal to said plane external to said rings supporting the other half of the guide ring, and a gear drive for the wrapping ring including a gear journaled on said axis meshing with the teeth on the wrapping ring.

4. Bundle-tying apparatus comprising a bundle-supporting table, a wrapping ring rotatably mounted adjacent the table, a gripper on the ring adapted to carry a tie wire about the bundle, a tensioning arm pivoted below the table, a gripper on said arm through which the wire is drawn by said first-mentioned gripper adapted to engage the wire to tension it on downtilting of said arm, and a block engaged by said gripper when said arm is upraised, effective to cause the second-mentioned gripper to release the wire.

5. The apparatus defined by claim 4 characterized by said second-mentioned gripper having a pair of cooperating opposed angularly related jaws movable therein, and springs urging said jaws into a position in which they engage the wire and project above the gripper so as to engage said block when said arm is upraised and be displaced thereby to wire-releasing position.

6. The apparatus defined by claim 5 characterized by said second-mentioned gripper also including a block pivoted on said arm having angularly related recesses therein to accommodate said jaws and a spring yieldably holding said block in a predetermined position relative to said arm.

7. Bundle-tying apparatus comprising a bundle-supporting table, a wrapping ring rotatably mounted adjacent the table, a gripper on the ring adapted to carry a tie wire about the bundle, a twister head movable from a retracted position to a working position adjacent said ring, a spindle journaled in said head having spaced opposed grippers movably mounted on the forward end thereof, mechanism for reciprocating said head, means for driving said spindle, a screw on said spindle, and a fixed nut with which said screw engages, effective to cause limited axial movement thereof while the head is in working position.

8. The apparatus defined by claim 7 characterized by a slide on which said head is mounted, said slide being actuated by said reciprocating mechanism, said head being movable on said slide, and a nut on said slide with which said screw cooperates.

9. The apparatus defined by claim 7 characterized by a slide on which said head is mounted, said mechanism including a face cam, a lever actuated thereby, a rack on the slide, a gear sector meshing therewith, and an operating connection between said lever and segment.

10. The apparatus defined by claim 7 characterized by said driving means including an elongated pinion on said spindle, a gear sector meshing therewith and crank means effective to oscillate said sector.

11. The apparatus defined by claim 7 characterized by common means for driving said reciprocating mechanism and said spindle-driving means.

12. The apparatus defined by claim 7 characterized by said head having spaced cutters effective to shear the wire on rotation of the spindle after the grippers on the spindle have engaged the wire.

13. The apparatus defined by claim 7 characterized by said spindle having oppositely extending wings at the forward end, and slots in said wings inclined to the axis of the spindle, said second-mentioned grippers being movable along said slots.

14. The apparatus defined by claim 7 characterized by said spindle being disposed radially of said ring and at an oblique angle to said table.

15. The apparatus defined in claim 7 characterized by a waste-end extractor hook mounted on said head adapted to engage the end of the piece of wire held in said first-mentioned gripper.

16. The apparatus defined by claim 15 characterized by said hook having cooperative engagement with said first-mentioned gripper to release it on movement of the head toward retracted position.

17. A bundle-tying machine comprising a bundle-supporting table, a wrapping ring rotatably mounted adjacent said table, a gripper on said ring adapted to draw a tie wire around the bundle, a stationary holding gripper through which the tie wire passes on being drawn around the bundle, a twister head movable from a retracted position to a tie-engaging position, grippers rotatably carried in said head, said head having cutters with which said grippers coact, said grippers being adapted to cut off a piece of wire wrapped around the bundle and the free end thereof and twist the cut ends together, a transfer gripper movable between said holding gripper and said wrapping-ring gripper, and control means actuating the transfer gripper from released position to engaged position after passing the holding gripper and restoring it to released position as it starts back toward the holding gripper.

18. The apparatus defined by claim 17 characterized by a slide reciprocable along the line between the holding gripper and the wrapping-ring gripper, said transfer gripper being mounted on said slide.

19. The apparatus defined by claim 18 characterized by said transfer gripper including a jaw fixed on said slide, a jaw pivoted on said slide and cooperating with said first-mentioned jaw, a bell crank pivoted on the slide effective to actuate the pivoted jaw, and stationary means tilting the bell crank in accordance with movement of the slide.

20. The apparatus defined by claim 18 characterized by means carried on said slide actuating the holding gripper from engaged to released position.

21. The apparatus defined by claim 17 characterized by said head being mounted on a slide reciprocable radially of the ring and means on said slide effective to actuate the holding gripper from released to engaged position.

22. A bundle-tying machine comprising a bundle-supporting table, an openable ring rotatably mounted adjacent one side of the table adapted to embrace a bundle of closed-ring form, said ring having a gripper thereon, means driving the ring to cause said gripper to draw a tie wire around the bundle, and a twister head below the table movable radially of the ring on an oblique angle to the horizontal, said table having a slot to admit the twister head and said head being disposed so as to approach a point at one side of the interior of the bundle.

23. Apparatus for inserting a wire tie through an article in the form of a closed ring, comprising a wrapping ring divided into two sectors and having external gear teeth, a vertically disposed guide ring divided along a horizontal plane, said wrapping ring being rotatable in said guide ring, fixed means mounting the lower portion of said guide ring, an arm extending laterally from the upper portion of said guide ring, a horizontal shaft journaled at one side of said guide ring externally thereof, said arm being tiltably supported on said shaft, and a gear on said shaft meshing with the teeth on the wrapping ring.

24. The apparatus defined by claim 23 characterized by releasable means effective to lock said wrapping ring against rotation, in a predetermined angular position relative to said guide ring.

25. The apparatus defined by claim 24 characterized by said means being a bolt disposed radially of the rings and movable longitudinally of itself.

26. Apparatus for inserting a wire tie through an article in the form of a closed ring, comprising a wrapping ring, a gripper thereon for seizing the end of said tie, said ring being divided into a plurality of sections whereby it is openable to embrace the article, and means mounting said ring for rotation in its own plane, said ring being vertically disposed and an article-supporting table adjacent said ring movable from an upper loading position to a lower tying position.

27. Apparaus for inserting a wire tie through an article in the form of a closed ring, comprising a wrapping ring divided along a diameter, a guide ring supporting the wrapping ring for rotation in its plane, the guide ring being divided along a diameter, and means mounting one portion of the guide ring for movement from and toward the other portion, said ring being vertically disposed and an article-supporting table adjacent said ring movable from an upper loading position to a lower tying position.

SILAS C. FONS.
FRANKLYN ALFRED KRAMER,
*Administrator of the estate of John Kramer, deceased.*

References Cited in the file of this patent

UNITED STATES PATENTS

| Number | Name | Date |
|---|---|---|
| 1,196,249 | Kosutz et al. | Aug. 29, 1916 |
| 1,261,589 | Mogan et al. | Apr. 2, 1918 |
| 1,955,727 | Adams | Apr. 24, 1934 |
| 2,099,601 | Fields | Nov. 16, 1937 |
| 2,198,440 | Marchand | Apr. 23, 1940 |
| 2,339,395 | Harvey | Jan. 18, 1944 |
| 2,387,658 | Gruber et al. | Oct. 23, 1945 |
| 2,446,776 | Matson | Aug. 10, 1948 |